(12) United States Patent
Matsubara

(10) Patent No.: US 7,672,762 B2
(45) Date of Patent: Mar. 2, 2010

(54) HYBRID VEHICLE AND CONTROL METHOD THEREOF

(75) Inventor: Tatsuyuki Matsubara, Toyota (JP)

(73) Assignee: Toyota Jidosha Kabuhsiki Kaisha, Aichi-ken (JP)

( * ) Notice: Subject to any disclaimer, the term of this patent is extended or adjusted under 35 U.S.C. 154(b) by 0 days.

(21) Appl. No.: 12/266,132

(22) Filed: Nov. 6, 2008

(65) Prior Publication Data
US 2009/0125172 A1     May 14, 2009

(30) Foreign Application Priority Data
Nov. 8, 2007   (JP)   ............................. 2007-290468

(51) Int. Cl.
    *G05D 3/00*   (2006.01)
(52) U.S. Cl. .................. 701/22; 701/113; 123/339.14; 123/339.16; 903/950; 903/951; 180/65.1
(58) Field of Classification Search .................. 701/22, 701/113; 123/339.14, 339.16; 903/930, 903/951; 180/65.1; 318/139; 60/277, 285, 60/698
    See application file for complete search history.

(56) References Cited

U.S. PATENT DOCUMENTS

| | | | | |
|---|---|---|---|---|
| 5,228,305 | A * | 7/1993 | Vogt .............................. | 62/133 |
| 6,213,233 | B1 * | 4/2001 | Sonntag et al. ......... | 180/65.245 |
| 6,899,162 | B2 * | 5/2005 | Hohl et al. ..................... | 165/41 |
| 2004/0050544 | A1 * | 3/2004 | Hohl et al. ................... | 165/202 |
| 2007/0265762 | A1 * | 11/2007 | Suzuki ........................ | 701/102 |

FOREIGN PATENT DOCUMENTS

| CN | 1828023 A | * | 9/2006 |
|---|---|---|---|
| CN | 100376764 C | * | 3/2008 |

(Continued)

OTHER PUBLICATIONS

Industrial applications of fuzzy logic at General Electric; Bonissone, P.P.; Badami, V.; Chiang, K.H.; Khedkar, P.S.; Marcelle, K.W.; Schutten, M.J.; Proceedings of the IEEE; vol. 83, Issue 3, Mar. 1995 pp. 450-465; Digital Object Identifier 10.1109/5.364490.*

(Continued)

*Primary Examiner*—Cuong H Nguyen
(74) *Attorney, Agent, or Firm*—Sughrue Mion, PLLC

(57) ABSTRACT

In an OFF condition of an ECO switch, a stop decision reference value Wstop is set to a value W1 (step S420). In an ON condition of the ECO switch, the stop decision reference value Wstop is set to a value W2 (step S430). When an output limit Wout of a battery set according to a battery temperature and a state of charge of the battery is not less than the set stop decision reference value Wstop, the engine is permitted to stop (step S450). When the output limit Wout is less than the set stop decision reference value Wstop, the engine is prohibited from stopping (step S460). The value W1 is specified as a value of electric power required for a smooth restart of the engine after its stop during a drive of the vehicle. The value W2 is specified to be close to a value of minimum electric power required for a restart of the engine after its stop during a drive of the vehicle and is set to be smaller than the value W1.

8 Claims, 10 Drawing Sheets

FOREIGN PATENT DOCUMENTS

| | | | | |
|---|---|---|---|---|
| GB | 2450957 | A | * | 1/2009 |
| JP | 2000161016 | A | * | 6/2000 |
| JP | 2004-044469 | A | | 2/2004 |
| JP | 2005-337173 | A | | 12/2005 |
| JP | 2007-159214 | A | | 6/2007 |
| JP | 2008137518 | A | * | 6/2008 |
| WO | WO 2009041138 | A1 | * | 4/2009 |

OTHER PUBLICATIONS

Large-scale electrical energy storage;Davidson, B.J.; Glendenning, I.; Harman, R.D.; Hart, A.B.; Maddock, B.J.; Moffitt, R.D.; Newman, V.G.; Smith, T.F.; Worthington, P.J.; Wright, J.K.; Physical Science, Measurement and Instrumentation, Management and Education, Reviews, IEE Proceedings A; vol. 127, Issue 6, Jul. 1980 pp. 345-385.*

Optimization of a Fuel-Cell EV Air-Conditioning System; Lawrence, C.P.; Salama, M.M.A.; Shatshat, R.A.E.; Electrical and Computer Engineering, 2007. CCECE 2007. Canadian Conference on; Apr. 22-26, 2007 pp. 1499-1502 Digital Object Identifier 10.1109/CCEC.2007.373.*

* cited by examiner

HYBRID VEHICLE AND CONTROL METHOD THEREOF

BACKGROUND

1. Technical Field

The present invention relates to a hybrid vehicle including an internal combustion engine, an electric power-mechanical power input output assembly connected with an output shaft of the internal combustion engine and with a driveshaft linked to an axle and constructed to utilize a reactive force on the driveshaft and input and output a torque from and to the output shaft of the internal combustion engine through input and output of electric power and mechanical power, a motor arranged to input and output power from and to the driveshaft, and an accumulator configured to transmit electric power to and from the electric power-mechanical power input output assembly and the motor, as well as to a control method of such a hybrid vehicle.

2. Related Art

One proposed configuration of a hybrid vehicle includes an engine, a planetary gear mechanism connected with an output shaft of the engine and with a driveshaft, a first motor connected with the planetary gear mechanism, a second motor arranged to output power to the driveshaft, and a battery arranged to transmit electric power to and from both the first motor and the second motor. A stop of engine operation is prohibited when the temperature of the battery is lower than a preset reference temperature (see, for example, Japanese Patent Laid-Open No. 2004-44469). The hybrid vehicle of this prior art structure continues the operation of the engine when the temperature of the battery is lower than the preset reference temperature, with a view to avoiding a restart of the engine in a state of the battery having insufficient electric power and reducing a response delay at the restart of the engine.

SUMMARY OF THE INVENTION

The hybrid vehicle of the above prior art structure prohibits a stop of engine operation under a certain battery temperature condition, in order to prevent a response delay at the restart of the engine. The continued engine operation until an increase in battery temperature to or above the preset reference temperature, however, causes the engine to be driven at a drive point of poor efficiency, thus lowering the overall energy efficiency of the whole vehicle. The driver of the hybrid vehicle may give preference to fuel consumption over the smooth engine restart performance. Responding to this driver's requirement is also desired.

In the hybrid vehicle and the control method of the hybrid vehicle, there would be a demand for ensuring a good restart performance while improving fuel consumption.

The present invention accomplishes at least part of the demand mentioned above and the other relevant demands by the following configurations applied to the hybrid vehicle and the control method of the hybrid vehicle.

According to one aspect, the invention is directed to a first hybrid vehicle including:

an internal combustion engine;

an electric power-mechanical power input output assembly connected with an output shaft of the internal combustion engine and with a driveshaft linked to an axle and constructed to utilize a reactive force on the driveshaft and input and output a torque from and to the output shaft of the internal combustion engine through input and output of electric power and mechanical power;

a motor arranged to input and output power from and to the driveshaft;

an accumulator configured to transmit electric power to and from the electric power-mechanical power input output assembly and the motor;

a temperature detector constructed to detect temperature of the accumulator;

an allowable maximum electric power setting module configured to set an allowable maximum electric power to be charged into the accumulator or to be discharged from the accumulator according to the detected temperature of the accumulator;

a fuel consumption priority switch operated to give an instruction for a drive with priority to fuel consumption; and an intermittent operation permission/prohibition module configured to, in a setting of the fuel consumption priority switch giving no instruction for the drive with priority to the fuel consumption, prohibit intermittent operation of the internal combustion engine when the set allowable maximum electric power of the accumulator is less than a first electric power and to permit the intermittent operation of the internal combustion engine when the set allowable maximum electric power of the accumulator is not less than the first electric power, the intermittent operation permission/prohibition module being configured to, in a setting of the fuel consumption priority switch giving the instruction for the drive with priority to the fuel consumption, prohibit the intermittent operation of the internal combustion engine when the set allowable maximum electric power of the accumulator is less than a second electric power that is smaller than the first electric power and to permit the intermittent operation of the internal combustion engine when the set allowable maximum electric power of the accumulator is not less than the second electric power.

In the setting of the fuel consumption priority switch giving no instruction for the drive with priority to the fuel consumption, the first hybrid vehicle according to this aspect of the invention prohibits the intermittent operation of the internal combustion engine when the allowable maximum electric power of the accumulator set according to the temperature of the accumulator is less than the first electric power, while permitting the intermittent operation of the internal combustion engine when the allowable maximum electric power of the accumulator is not less than the first electric power. In the setting of the fuel consumption priority switch giving the instruction for the drive with priority to the fuel consumption, the first hybrid vehicle of the invention prohibits the intermittent operation of the internal combustion engine when the allowable maximum electric power of the accumulator is less than the second electric power that is smaller than the first electric power, while permitting the intermittent operation of the internal combustion engine when the allowable maximum electric power of the accumulator is not less than the second electric power. This arrangement ensures the good restart performance in the ordinary state, while responding to the driver's instruction for the drive with priority to the fuel consumption.

According to one aspect, the invention is directed to a second hybrid vehicle including:

an internal combustion engine;

an electric power-mechanical power input output assembly connected with an output shaft of the internal combustion engine and with a driveshaft linked to an axle and constructed to utilize a reactive force on the driveshaft and input and output a torque from and to the output shaft of the internal combustion engine through input and output of electric power and mechanical power;

a motor arranged to input and output power from and to the driveshaft;

an accumulator configured to transmit electric power to and from the electric power-mechanical power input output assembly and the motor;

a temperature detector constructed to detect temperature of the accumulator;

a fuel consumption priority switch operated to give an instruction for a drive with priority to fuel consumption; and an intermittent operation permission/prohibition module configured to, in a setting of the fuel consumption priority switch giving no instruction for the drive with priority to the fuel consumption, prohibit intermittent operation of the internal combustion engine when the detected temperature of the accumulator is lower than a first temperature and to permit the intermittent operation of the internal combustion engine when the detected temperature of the accumulator is not lower than the first temperature, the intermittent operation permission/prohibition module being configured to, in a setting of the fuel consumption priority switch giving the instruction for the drive with priority to the fuel consumption, prohibit the intermittent operation of the internal combustion engine when the detected temperature of the accumulator is lower than a second temperature that is less than the first temperature and to permit the intermittent operation of the internal combustion engine when the detected temperature of the accumulator is not lower than the second temperature.

In the setting of the fuel consumption priority switch giving no instruction for the drive with priority to the fuel consumption, the second hybrid vehicle according to this aspect of the invention prohibits the intermittent operation of the internal combustion engine when the temperature of the accumulator is lower than the first temperature, while permitting the intermittent operation of the internal combustion engine when the temperature of the accumulator is not lower than the first temperature. In the setting of the fuel consumption priority switch giving the instruction for the drive with priority to the fuel consumption, the second hybrid vehicle of the invention prohibits the intermittent operation of the internal combustion engine when the temperature of the accumulator is lower than the second temperature that is less than the first temperature, while permitting the intermittent operation of the internal combustion engine when the temperature of the accumulator is not lower than the second temperature. This arrangement also ensures the good restart performance in the ordinary state, while responding to the driver's instruction for the drive with priority to the fuel consumption.

In one preferable application of either of the first hybrid vehicle and the second hybrid vehicle according to the above aspects of the invention, the intermittent operation permission/prohibition module is activated at a start of the internal combustion engine in a cold environment.

In one preferable embodiment of either of the first hybrid vehicle and the second hybrid vehicle according to the above aspects of the invention, the electric power-mechanical power input output assembly has: a generator designed to input and output power; and a three shaft-type power input output structure connected to three shafts, the driveshaft, the output shaft of the internal combustion engine, and a rotating shaft of the generator, and designed to input and output power to a residual shaft based on powers input from and output to any two shafts among the three shafts.

Another aspect of the invention is directed to a first control method of a hybrid vehicle. The hybrid vehicle has:

an internal combustion engine; an electric power-mechanical power input output assembly connected with an output shaft of the internal combustion engine and with a driveshaft linked to an axle and constructed to utilize a reactive force on the driveshaft and input and output a torque from and to the output shaft of the internal combustion engine through input and output of electric power and mechanical power; a motor arranged to input and output power from and to the driveshaft; and an accumulator configured to transmit electric power to and from the electric power-mechanical power input output assembly and the motor. The first control method of the hybrid vehicle sets an allowable maximum electric power to be charged into the accumulator or to be discharged from the accumulator according to temperature of the accumulator. In a setting of a fuel consumption priority switch giving no instruction for a drive with priority to fuel consumption, the first control method prohibits intermittent operation of the internal combustion engine when the set allowable maximum electric power of the accumulator is less than a first electric power, while permitting the intermittent operation of the internal combustion engine when the set allowable maximum electric power of the accumulator is not less than the first electric power. In a setting of the fuel consumption priority switch giving the instruction for the drive with priority to the fuel consumption, the first control method prohibits the intermittent operation of the internal combustion engine when the set allowable maximum electric power of the accumulator is less than a second electric power that is smaller than the first electric power, while permitting the intermittent operation of the internal combustion engine when the set allowable maximum electric power of the accumulator is not less than the second electric power.

In the setting of the fuel consumption priority switch giving no instruction for the drive with priority to the fuel consumption, the first control method of the hybrid vehicle according to this aspect of the invention prohibits the intermittent operation of the internal combustion engine when the allowable maximum electric power of the accumulator set according to the temperature of the accumulator is less than the first electric power, while permitting the intermittent operation of the internal combustion engine when the allowable maximum electric power of the accumulator is not less than the first electric power. In the setting of the fuel consumption priority switch giving the instruction for the drive with priority to the fuel consumption, the first control method of the invention prohibits the intermittent operation of the internal combustion engine when the allowable maximum electric power of the accumulator is less than the second electric power that is smaller than the first electric power, while permitting the intermittent operation of the internal combustion engine when the allowable maximum electric power of the accumulator is not less than the second electric power. This arrangement ensures the good restart performance in the ordinary state, while responding to the driver's instruction for the drive with priority to the fuel consumption.

Still another aspect of the invention is directed to a second control method of a hybrid vehicle. The hybrid vehicle has: an internal combustion engine; an electric power-mechanical power input output assembly connected with an output shaft of the internal combustion engine and with a driveshaft linked to an axle and constructed to utilize a reactive force on the driveshaft and input and output a torque from and to the output shaft of the internal combustion engine through input and output of electric power and mechanical power; a motor arranged to input and output power from and to the driveshaft; and an accumulator configured to transmit electric power to and from the electric power-mechanical power input output assembly and the motor. In a setting of a fuel consumption priority switch giving no instruction for a drive with priority to fuel consumption, the second control method prohibits intermittent operation of the internal combustion engine when temperature of the accumulator is lower than a first temperature, while permitting the intermittent operation of the internal combustion engine when the temperature of the accumulator is not lower than the first temperature. In a setting of the fuel consumption priority switch giving the instruction for the drive with priority to the fuel consumption, the second control method prohibits the intermittent operation of the internal combustion engine when the temperature of the accumulator is lower than a second temperature that is less than the first temperature, while permitting the intermittent operation of the internal combustion engine when the temperature of the accumulator is not lower than the second temperature.

In the setting of the fuel consumption priority switch giving no instruction for the drive with priority to the fuel consumption, the second control method of the hybrid vehicle according to this aspect of the invention prohibits the intermittent operation of the internal combustion engine when the temperature of the accumulator is lower than the first temperature, while permitting the intermittent operation of the internal combustion engine when the temperature of the accumulator is not lower than the first temperature. In the setting of the fuel consumption priority switch giving the instruction for the drive with priority to the fuel consumption, the second control method of the invention prohibits the intermittent operation of the internal combustion engine when the temperature of the accumulator is lower than the second temperature that is less than the first temperature, while permitting the intermittent operation of the internal combustion engine when the temperature of the accumulator is not lower than the second temperature. This arrangement also ensures the good restart performance in the ordinary state, while responding to the driver's instruction for the drive with priority to the fuel consumption.

DESCRIPTION OF THE PREFERRED EMBODIMENTS

Figure 1:
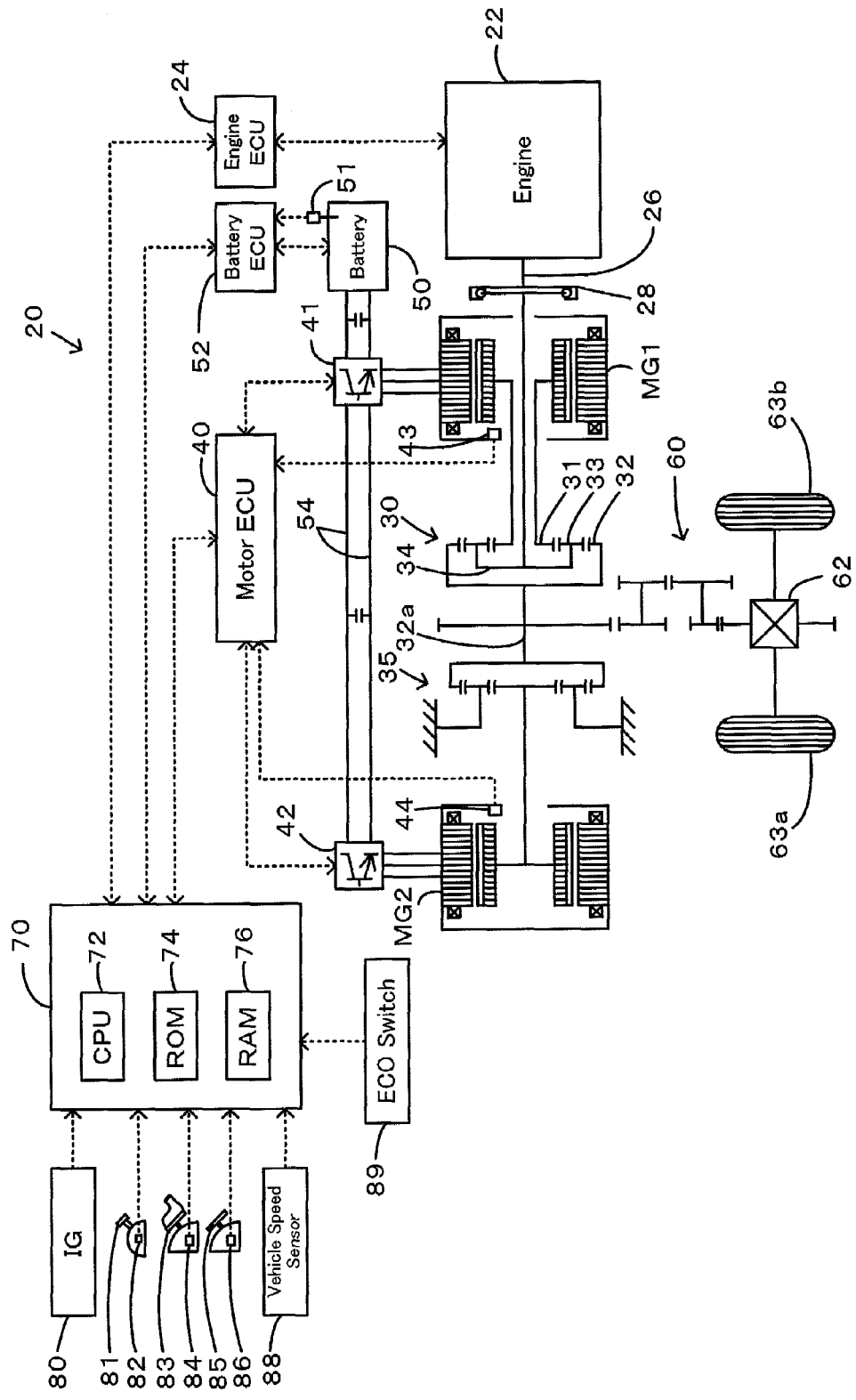
FIG. 1 schematically illustrates the configuration of a hybrid vehicle in one embodiment according to the invention.

FIG. 1 schematically illustrates the configuration of a hybrid vehicle in one embodiment according to the invention. As illustrated, the hybrid vehicle 20 of the embodiment includes the engine 22, a three shaft-type power distribution integration mechanism 30 connected via a damper 28 to a crankshaft 26 or an output shaft of the engine 22, a motor MG1 connected to the power distribution integration mechanism 30 and designed to have power generation capability, a reduction gear 35 attached to a ring gear shaft 32a or a driveshaft linked with the power distribution integration mechanism 30, a motor MG2 connected to the reduction gear 35, and a hybrid electronic control unit 70 configured to control the operations of the whole hybrid vehicle 20. The engine 22 and an engine electronic control unit 24 configured to control the operations of the engine 22 constitute the internal combustion engine system of this embodiment.

The engine 22 is an internal combustion engine that consumes a hydrocarbon fuel, such as gasoline or light oil, to output power. The engine 22 is under operation control of an engine electronic control unit (hereafter referred to as engine ECU) 24, which inputs signals from various sensors used to measure and detect the operating conditions of the engine 22 and performs operation controls of the engine 22, for example, fuel injection control, ignition control, and intake air flow control. The engine ECU 24 establishes communication with the hybrid electronic control unit 70 to drive and control the engine 22 in response to control signals from the hybrid electronic control unit 70 and with reference to the diverse signals from the various sensors and to output data regarding the operating conditions of the engine 22 to the hybrid electronic control unit according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

The motors MG1 and MG2 are constructed as known synchronous motor generators to enable operations as both a generator and a motor. The motors MG1 and MG2 transmit electric power to and from a battery 50 via inverters 41 and 42. Power lines 54 connecting the battery 50 with the inverters 41 and 42 are structured as common positive bus and negative bus shared by the inverters 41 and 42. Such connection enables electric power generated by one of the motors MG1 and MG2 to be consumed by the other motor MG2 or MG1. The battery 50 may thus be charged with surplus electric power generated by either of the motors MG1 and MG2, while being discharged to supplement insufficient electric power. The battery 50 is neither charged nor discharged upon the balance of the input and output of electric powers between the motors MG1 and MG2. Both the motors MG1 and MG2 are driven and controlled by a motor electronic control unit (hereafter referred to as motor ECU) 40. The motor ECU 40 inputs various signals required for driving and controlling the motors MG1 and MG2, for example, signals representing rotational positions of rotors in the motors MG1 and MG2 from rotational position detection sensors 43 and 44 and signals representing phase currents to be applied to the motors MG1 and MG2 from current sensors (not shown). The motor ECU 40 outputs switching control signals to the inverters 41 and 42. The motor ECU 40 establishes communication with the hybrid electronic control unit 70 to drive and control the motors MG1 and MG2 in response to control signals received from the hybrid electronic control unit 70 and to output data regarding the operating conditions of the motors MG1 and MG2 to the hybrid electronic control unit 70 according to the requirements. The motor ECU 40 also performs arithmetic operations to compute rotation speeds Nm1 and Nm2 of the motors MG1 and MG2 from the output signals of the rotational position detection sensors 43 and 44.

Figure 2:
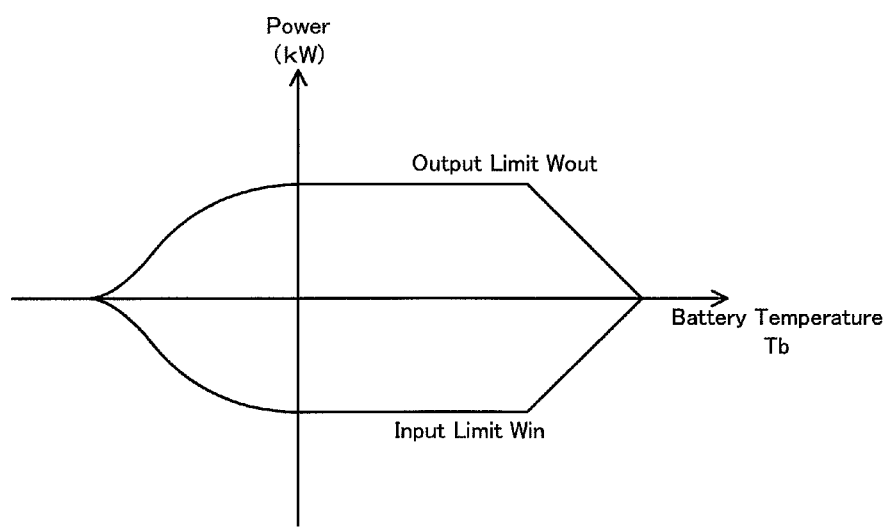
FIG. 2 shows variations of an input limit Win and an output limit Wout against battery temperature Tb of a battery 50.
Figure 3:
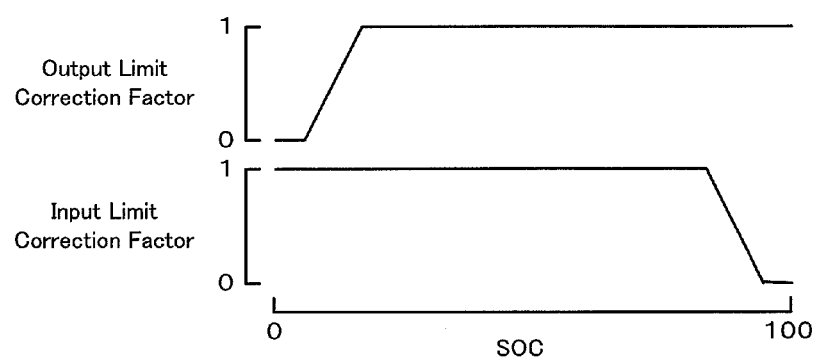
FIG. 3 shows variations of an input limit correction factor and an output limit correction factor against state of charge SOC of the battery 50.

The battery 50 is under control and management of a battery electronic control unit (hereafter referred to as battery ECU) 52. The battery ECU 52 inputs signals required for management and control of the battery 50, for example, an inter-terminal voltage from a voltage sensor (not shown) located between terminals of the battery 50, a charge-discharge current from a current sensor (not shown) located in the power line 54 connecting with an output terminal of the battery 50, and a battery temperature Tb from a temperature sensor 51 attached to the battery 50. The battery ECU 52 outputs data regarding the operating conditions of the battery 50 by communication to the hybrid electronic control unit 70 according to the requirements. The battery ECU 52 also performs various arithmetic operations for management and control of the battery 50. A remaining charge or state of charge SOC of the battery 50 is calculated from an integrated value of the charge-discharge current measured by the current sensor. An input limit Win as an allowable maximum charging electric power to be charged in the battery 50 and an output limit Wout as an allowable maximum discharging electric power to be discharged from the battery 50 are set corresponding to the calculated state of charge SOC and the battery temperature Tb. A concrete procedure of setting the input and output limits Win and Wout of the battery 50 sets base values of the input limit Win and the output limit Wout corresponding to the battery temperature Tb, specifies an input limit correction factor and an output limit correction factor corresponding to the state of charge SOC of the battery 50, and multiplies the base values of the input limit Win and the output limit Wout by the specified input limit correction factor and output limit correction factor to determine the input limit Win and the output limit Wout of the battery 50. FIG. 2 shows variations of the input limit Win and the output limit Wout against the battery temperature Tb of the battery 50. FIG. 3 shows variations of the input limit correction factor and the output limit correction factor against the state of charge SOC of the battery 50.

The hybrid electronic control unit 70 is constructed as a microprocessor and includes a CPU 72, a ROM 74 that stores processing programs, a RAM 76 that temporarily stores data, an input-output port (not shown), and a communication port (not shown). The hybrid electronic control unit 70 receives, via its input port, an ignition signal from an ignition switch 80, a gearshift position SP or a current setting position of a gearshift lever 81 from a gearshift position sensor 82, an accelerator opening Acc or the driver's depression amount of an accelerator pedal 83 from an accelerator pedal position sensor 84, a brake pedal position BP or the driver s depression amount of a brake pedal 85 from a brake pedal position sensor 86, a vehicle speed V from a vehicle speed sensor 88, and an ECO switch signal ESW from an ECO switch 89 operated by the driver to give priority to the fuel consumption.

The hybrid vehicle 20 of the embodiment constructed as described above sets a torque demand, which is to be output to the ring gear shaft 32a or the driveshaft, based on the vehicle speed V and the accelerator opening Acc determined by the driver's depression amount of the accelerator pedal 83, and controls the operations of the engine 22 and the motors MG1 and MG2 to ensure output of a power demand equivalent to the preset torque demand Tr* to the ring gear shaft 32a. There are several drive control modes of the engine 22 and the motors MG1 and MG2. In a torque conversion drive mode, while the engine 22 is driven and controlled to output a required level of power corresponding to the power demand, the motors MG1 and MG2 are driven and controlled to enable all the output power of the engine 22 to be subjected to torque conversion by the power distribution integration mechanism 30 and the motors MG1 and MG2 and to be output to the ring gear shaft 32a. In a charge-discharge drive mode, the engine 22 is driven and controlled to output a required level of power corresponding to the sum of the power demand and electric power used to charge the battery 50 or discharged from the battery 50. The motors MG1 and MG2 are driven and controlled to enable all or part of the output power of the engine 22, which is equivalent to the power demand with charge or discharge of the battery 50, to be subjected to torque conversion by the power distribution integration mechanism 30 and the motors MG1 and MG2 and to be output to the ring gear shaft 32a. In a motor drive mode, the motor MG2 is driven and controlled to ensure output of a required level of power corresponding to the power demand to the ring gear shaft 32a, while the engine 22 stops its operation.

Figure 4:
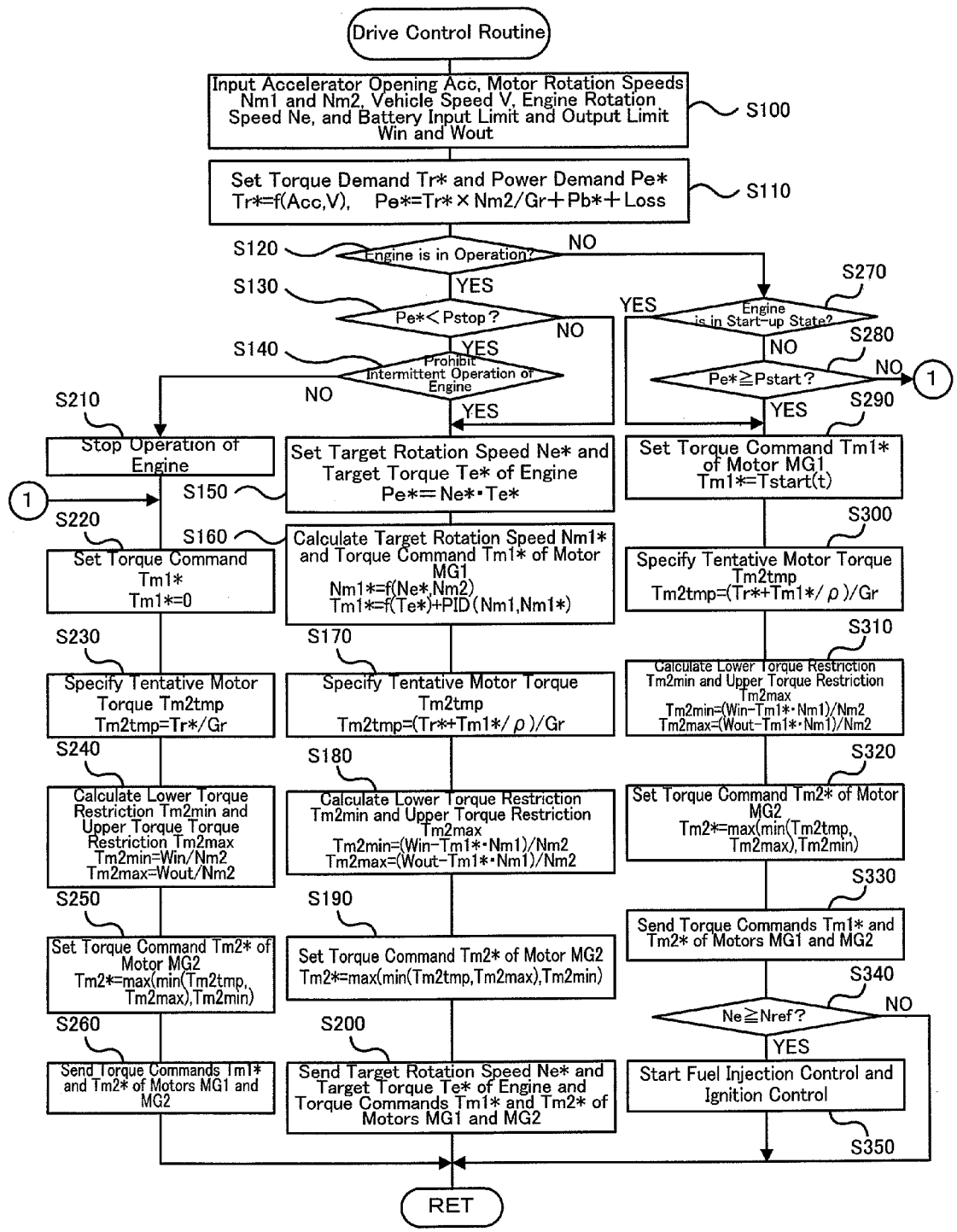
FIG. 4 is a flowchart showing a drive control routine executed by a hybrid electronic control unit 70 in the embodiment.
Figure 5:
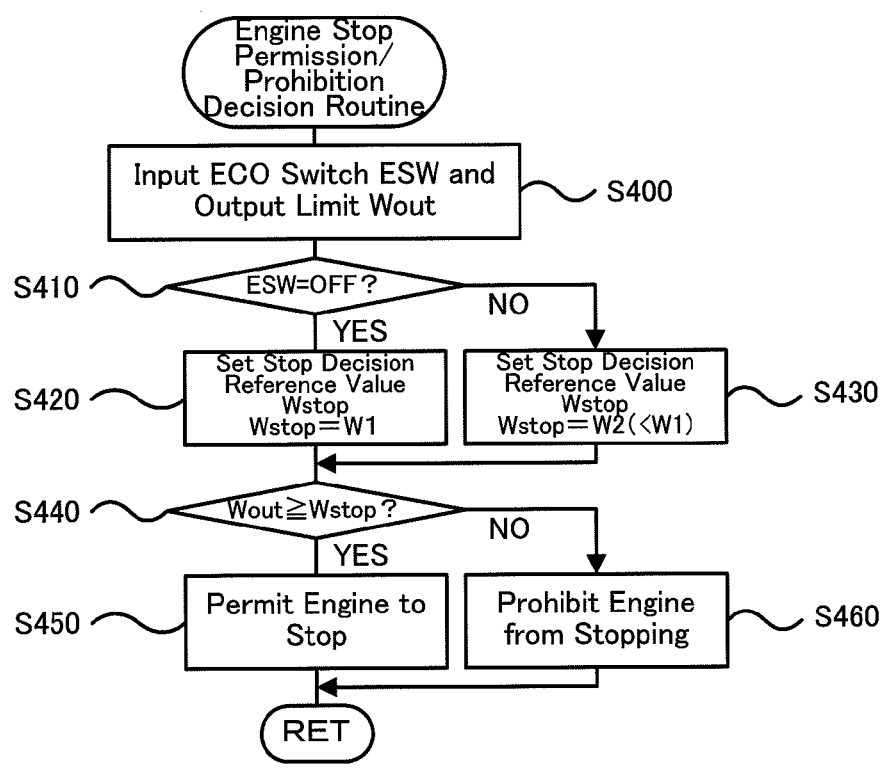
FIG. 5 is a flowchart showing an engine stop permission/prohibition decision routine executed by the hybrid electronic control unit 70 in the embodiment.

The following describes the operations of the hybrid vehicle 20 of the embodiment having the configuration discussed above, especially a series of control operations in the state of system activation and driving the vehicle with a start of the engine 22 in a cold environment of low outside air temperature (for example, −10° C. or −20° C.). FIG. 4 is a flowchart showing a drive control routine executed by the hybrid electronic control unit 70. FIG. 5 is a flowchart showing an engine stop permission/prohibition decision routine executed by the hybrid electronic control unit 70. For convenience of explanation, the description regards first the engine stop permission/prohibition decision routine of FIG. 5 and subsequently the drive control routine of FIG. 4.

Figure 6:
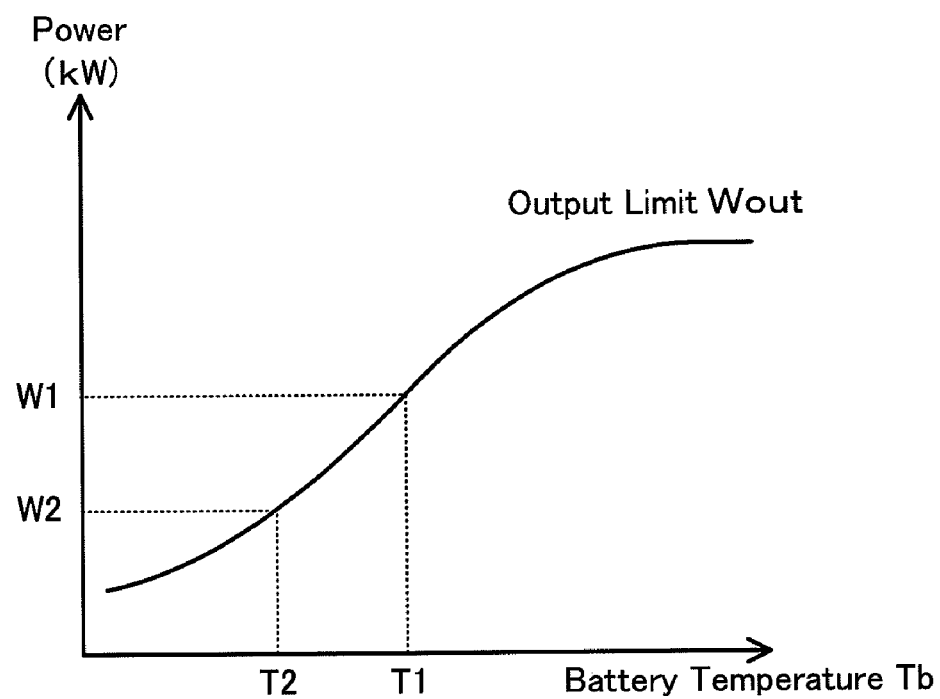
FIG. 6 shows a variation in output limit Wout against the battery temperature Tb in the cold environment.

At the start of the engine stop permission/prohibition decision routine, the CPU 72 of the hybrid electronic control unit 70 first inputs the ECO switch signal ESW from the ECO switch 89 and the output limit Wout of the battery 50 (step S400) and identifies whether the input ECO switch signal ESW is OFF or ON (step S410). Upon identification of the OFF condition of the ECO switch signal ESW, the CPU 72 sets a stop decision reference value Wstop to a value W1 (step S420). Upon identification of the ON condition of the ECO switch signal ESW, on the other hand, the CPU 72 sets the stop decision reference value Wstop to a value W2 (step S430). The output limit Wout of the battery 50 is then compared with the set stop decision reference value Wstop (step S440). When the output limit Wout is not lower than the set stop decision reference value Wstop, the engine 22 is permitted to stop (step S450). When the output limit Wout is lower than the set stop decision reference value Wstop, on the other hand, the engine 22 is prohibited from stopping (step S460). After the permission or the prohibition of the engine stop, the engine stop permission/prohibition decision routine is terminated. The value W1 is specified as a value of electric power required for a smooth restart of the engine 22 after its stop during a drive of the vehicle. The value W2 is specified to be close to a value of minimum electric power required for a restart of the engine 22 after its stop during a drive of the vehicle and is set to be smaller than the value W1. FIG. 6 shows a variation in output limit Wout against the battery temperature Tb in the cold environment. As illustrated, the output limit Wout decreases with a decrease in battery temperature Tb in the cold environment. During a drive of the vehicle in the engine stop state (that is, in the motor drive mode), electric power supplied from the battery 50 is used to drive the motor MG2. For a restart of the engine 22 in this state, the battery 50 is required to output the sum of the electric power required for driving the vehicle and the electric power required for the engine restart. The restart of the engine 22 may accordingly have some response delay in the cold environment. The procedure of this embodiment sets the value W1 to the stop decision reference value Wstop in the OFF condition of the ECO switch 89 and permits the engine 22 to stop only after the sufficient warm-up of the battery 50 to the level of ensuring output of sufficient electric power. Such control ensures a smooth restart of the engine 22 after its stop. In the state of prohibiting the engine 22 from stopping but making the engine 22 continue its operation, the engine 22 is operated at a drive point of pore efficiency. This undesirably lowers the overall energy efficiency of the whole vehicle. In response to an ON operation of the ECO switch 89, the engine 22 is permitted to stop after the warm-up of the battery 50 to the level of ensuring substantial output of the minimum electric power required for restarting the engine 22 after its top during a drive of the vehicle. Such control ensures a restart of the engine 22, while improving the overall energy efficiency of the whole vehicle.

The description now regards the drive control routine of FIG. 4. At the start of the drive control routine, the CPU 72 of the hybrid electronic control unit 70 first inputs various data required for control, for example, the accelerator opening Acc from the accelerator pedal position sensor 84, the vehicle speed V from the vehicle speed sensor 88, a rotation speed Ne of the engine 22, rotation speeds Nm1 and Nm2 of the motors MG1 and MG2, and the input limit Win and the output limit Wout of the battery 50 (step S100). The rotation speed Ne of the engine 22 is computed from a crank position detected by a crank position sensor (not shown) and is received from the engine ECU 24 by communication. The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication. The input limit Win and the output limit Wout of the battery 50 are set according to the battery temperature Tb and the state of charge SOC of the battery 50 by the battery ECU 52 and are received from the battery ECU 52 by communication.

Figure 7:
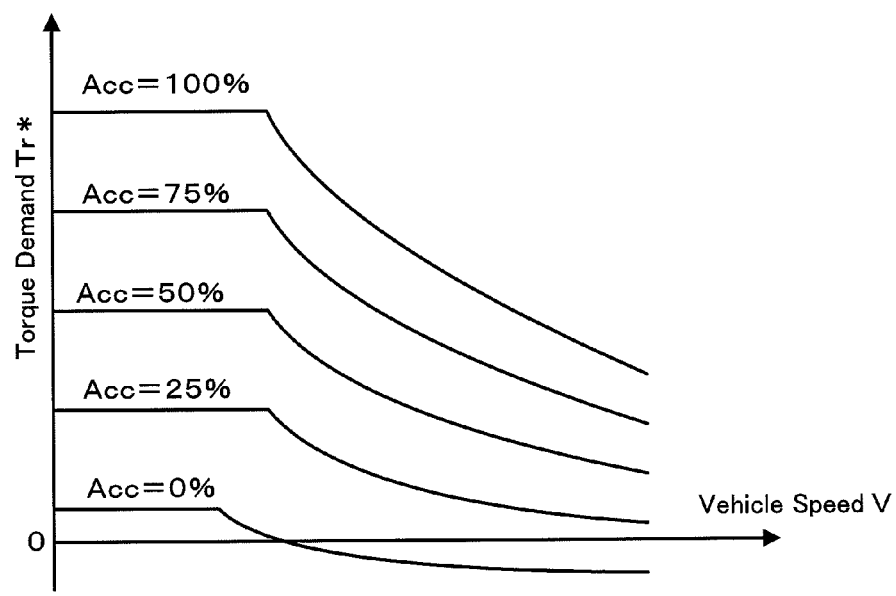
FIG. 7 shows one example of a torque demand setting map.

After the data input, the CPU 72 sets a torque demand Tr* to be output to the ring gear shaft 32a or the driveshaft linked with the drive wheels 63a and 63b as a torque required for the hybrid vehicle 20 and a power demand Pe* to be output from the engine 22, based on the input accelerator opening Acc and the input vehicle speed V (step S110). A concrete procedure of setting the torque demand Tr* in this embodiment stores in advance variations in torque demand Tr* against the vehicle speed V with regard to various settings of the accelerator opening Acc as a torque demand setting map in the ROM 74 and reads the torque demand Tr* corresponding to the given accelerator opening Acc and the given vehicle speed V from this torque demand setting map. One example of the torque demand setting map is shown in FIG. 7. The power demand Pe* is calculated as the sum of the product of the set torque demand Tr* and a rotation speed Nr of the ring gear shaft 32a, a charge-discharge power demand Pb* to be charged into or discharged from the battery 50, and a potential loss. The rotation speed Nr of the ring gear shaft 32a is obtained by multiplying the vehicle speed V by a preset conversion factor k (Nr=k·V) or by dividing the rotation speed Nm2 of the motor MG2 by a gear ratio Gr of the reduction gear 35 (Nr=Nm2/Gr).

The CPU 72 subsequently determines whether the engine 22 is in operation (step S120). When the engine 22 is in operation, the set power demand Pe* is compared with a preset reference value Pstop used as a criterion for stopping the operation of the engine 22 (step S130). The reference value Pstop is set close to a lower limit value in a specific power range that ensures relatively efficient operation of the engine 22.

Figure 8:
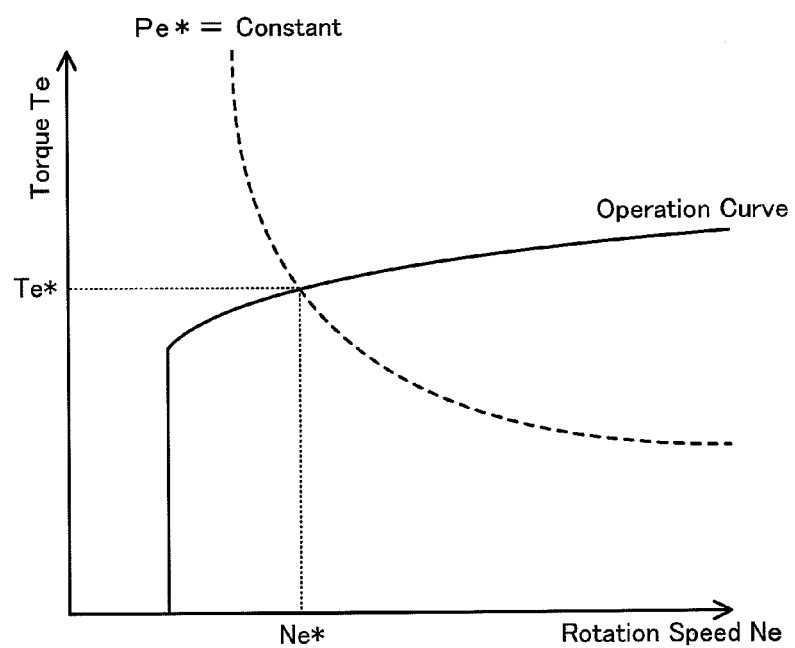
FIG. 8 shows an operation curve of an engine 22 used to set a target rotation speed Ne* and a target torque Te* of the engine 22.

When it is determined at step S130 that the power demand Pe* is not less than the preset reference value Pstop, there is a requirement for keeping the operation of the engine 22. A target rotation speed Ne* and a target torque Te* defining a target drive point of the engine 22 are set, based on the power demand Pe* of the engine 22 (step S150). In this embodiment, the target rotation speed Ne* and the target torque Te* are determined according to an operation curve of ensuring efficient operation of the engine 22 and a curve of the power demand Pe*. FIG. 8 shows an operation curve of the engine 22 used to set the target rotation speed Ne* and the target torque Te*. As clearly shown in FIG. 8, the target rotation speed Ne* and the target torque Te* are given as an intersection of the operation curve and a curve of constant power demand Pe* (=Ne*×Te*).

The CPU 72 subsequently calculates a target rotation speed Nm1* of the motor MG1 from the target rotation speed Ne* of the engine 22, the input rotation speed Nm2 of the motor MG2, and a gear ratio ρ of the power distribution integration mechanism 30 according to Equation (1) given below, while calculating a torque command Tm1* as a torque to be output from the motor MG1 from the calculated target rotation speed Nm1* and the input rotation speed Nm1 of the motor MG1 according to Equation (2) given below (step S160):

$$Nm1^* = Ne^* \cdot (1+\rho)/\rho - Nm2/Gr \quad (1)$$

$$Tm1^* = \rho \cdot Te^*/(1+\rho) + k1(Nm1^* - Nm1) + k2\int(Nm1^* - Nm1)dt \quad (2)$$

Figure 9:
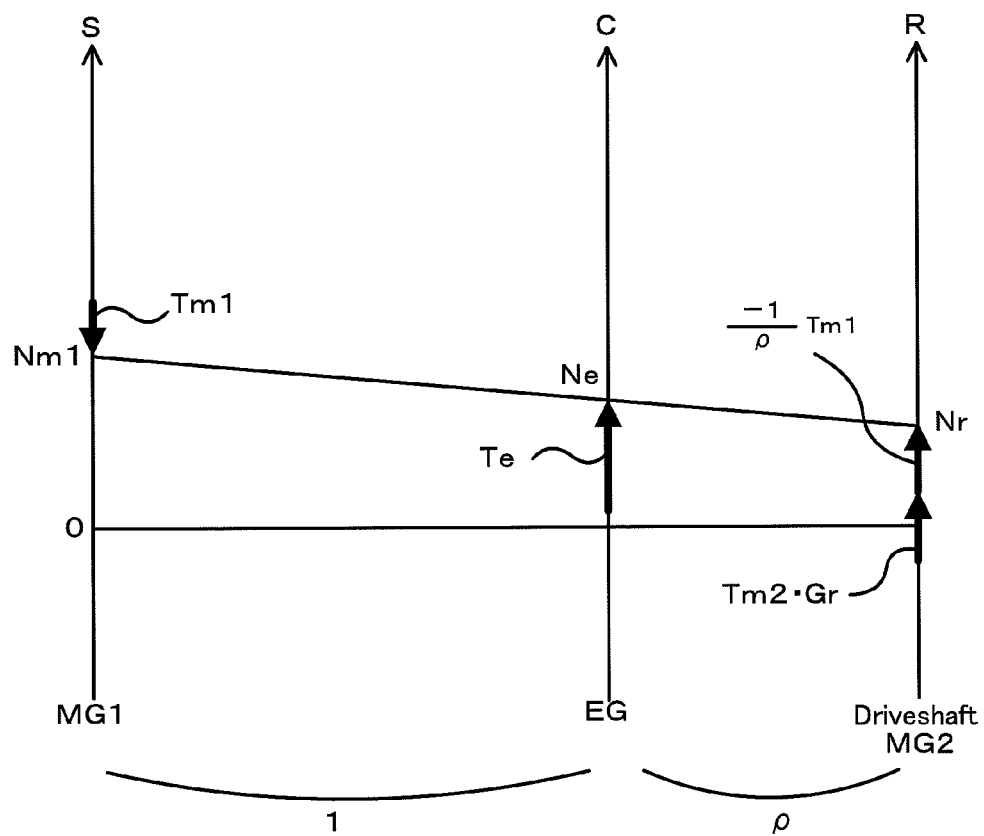
FIG. 9 is an alignment chart showing torque-rotation speed dynamics of respective rotational elements included in a power distribution integration mechanism 30 during a drive of the hybrid vehicle with output power of the engine 22.

Equation (1) is a dynamic relational expression of respective rotational elements included in the power distribution integration mechanism 30. FIG. 9 is an alignment chart showing torque-rotation speed dynamics of the respective rotational elements included in the power distribution integration mechanism 30 during a drive of the hybrid vehicle 20 with output power of the engine 22. The left axis 'S' represents a rotation speed of the sun gear 31 that is equivalent to the rotation speed Nm1 of the motor MG1. The middle axis 'C' represents a rotation speed of the carrier 34 that is equivalent to the rotation speed Ne of the engine 22. The right axis 'R' represents the rotation speed Nr of the ring gear 32 obtained by dividing the rotation speed Nm2 of the motor MG2 by the gear ratio Gr of the reduction gear 35. Equation (1) is readily introduced from this alignment chart. Two thick arrows on the axis 'R' respectively show a torque applied to the ring gear shaft 32a by output of the torque Tm1 from the motor MG1, and a torque applied to the ring gear shaft 32a via the reduction gear 35 by output of the torque Tm2 from the motor MG2. Equation (2) is a relational expression of feedback control to drive and rotate the motor MG1 at the target rotation speed Nm1*. In Equation (2) given above, 'k1' in the second term and 'k2' in the third term on the right side respectively denote a gain of the proportional and a gain of the integral term.

The CPU 72 then adds the result of division of the torque command Tm1* by the gear ratio ρ of the power distribution integration mechanism 30 to the torque demand Tr* to specify a tentative torque Tm2tmp as a provisional value of torque to be output from the motor MG2 according to Equation (3) given below (step S170):

$$Tm2tmp = (Tr^* + Tm1^*/\rho)/Gr \quad (3)$$

The CPU 72 subsequently calculates a lower torque restriction Tm2min and an upper torque restriction Tm2max as allowable minimum and maximum torques output from the motor MG2 according to Equations (4) and (5) given below (step S180):

$$Tm2\min = (Win - Tm1^* \cdot Nm1)/Nm2 \quad (4)$$

$$Tm2\max = (Wout - Tm1^* \cdot Nm1)/Nm2 \quad (5)$$

The lower torque restriction Tm2min and the upper torque restriction Tm2max are obtained by dividing respective differences between the input limit Win or the output limit Wout of the battery 50 and power consumption (power generation) of the motor MG1, which is the product of the calculated torque command Tm1* and the current rotation speed Nm1 of the motor MG1, by the current rotation speed Nm2 of the motor MG2. The CPU 72 then limits the specified tentative torque Tm2tmp by the calculated lower torque restriction Tm2min and upper torque restriction Tm2max according to Equation (6) given below to set a torque command Tm2* of the motor MG2 (step S190):

$$Tm2^* = \max(\min(Tm2tmp, Tm2\max), Tm2\min) \quad (6)$$

Equation (3) given above is readily introduced from the alignment chart of FIG. 9.

After setting the target rotation speed Ne* and the target torque Te* of the engine 22 and the torque commands Tm1* and Tm2* of the motors MG1 and MG2, the CPU 72 sends the target rotation speed Ne* and the target torque Te* of the engine 22 to the engine ECU 24 and the torque commands Tm1* and Tm2* of the motors MG1 and MG2 to the motor ECU 40 (step S200) and exits from the drive control routine of FIG. 4. The engine ECU 24 receives the settings of the target rotation speed Ne* and the target torque Te* and performs required controls of the engine 22, such as intake air flow control, fuel injection control, and ignition control, to drive the engine 22 at a target drive point defined by the combination of the target rotation speed Ne* and the target torque Te*. The motor ECU 40 receives the settings of the torque commands Tm1* and Tm2* and performs switching control of switching elements included in the respective inverters 41 and 42 to drive the motor MG1 with the torque command Tm1* and the motor MG2 with the torque command Tm2*. Such control enables the hybrid vehicle 20 to be driven with output of the torque demand Tr* to the ring gear shaft 32a or the driveshaft in the range of the input limit Win and the output limit Wout of the battery 50, while operating the engine 22 with high efficiency.

When it is determined at step S130 that the power demand Pe* is less than the preset reference value Pstop, on the other hand, the CPU 72 determines whether a stop of the engine 22 is prohibited or permitted (step S140) according to the engine stop permission/prohibition decision routine of FIG. 5. Upon determination that the engine 22 is prohibited from stopping, there is a requirement for keeping the operation of the engine 22. The processing of steps S150 to S200 discussed above is then performed.

When it is determined at step S130 that the power demand Pe* is less than the preset reference value Pstop and it is determined at step S140 that the engine 22 is permitted to stop, there is a requirement for stopping the operation of the engine 22. The CPU 72 then sends a control signal to the engine ECU 24 to interrupt the fuel injection control and the ignition control and accordingly stop the operation of the engine 22 (step S210) and sets 0 to the torque command Tm1* of the motor MG1 (step S220). Division of the torque demand Tr* by the gear ratio Gr of the reduction gear 35 is set to the tentative torque Tm2tmp as the provisional value of torque to be output from the motor MG2 (step S230). Substitution of the torque command Tm1* set equal to 0 into Equations (4) and (5) given above determines the lower torque restriction Tm2min and the upper torque restriction Tm2max of the motor MG2 (step S240) The torque command Tm2* of the motor MG2 is subsequently set by limiting the tentative torque Tm2tmp with the lower torque restriction Tm2min and the upper torque restriction Tm2max according to Equation (6) given above (step S250). The CPU 72 sends the settings of the torque commands Tm1* and Tm2* of the motors MG1 and MG2 to the motor ECU 40 (step S260) and exits from the drive control routine of FIG. 4. Such control enables the hybrid vehicle 20 to be driven with output of the torque demand Tr* from the motor MG2 to the ring gear shaft 32a or the driveshaft in the range of the input limit Win and the output limit Wout of the battery 50, while stopping the operation of the engine 22.

When it is determined at step S120 that the engine 22 is not in operation but is at stop, the CPU 72 sequentially determines whether the engine 22 is in a start-up state (step S270) and whether the power demand Pe* is not less than a preset reference value Pstart used as a criterion for starting the engine 22 (step S280). The reference value Pstart may be set close to the lower limit value in the specific power range that ensures relatively efficient operation of the engine 22. In order to prevent frequent stops and restarts of the engine 22, the reference value Pstart is preferably greater than the reference value Pstop used as the criterion for stopping the operation of the engine 22. Under the conditions that the engine 22 is at stop (step S120) and is not in the start-up state (step S270) and that the power demand Pe* is less than the preset reference value Pstart (step S280), it is determined to keep the operation stop state of the engine 22. The processing of steps S220 and S260 discussed above is then performed.

Figure 10:
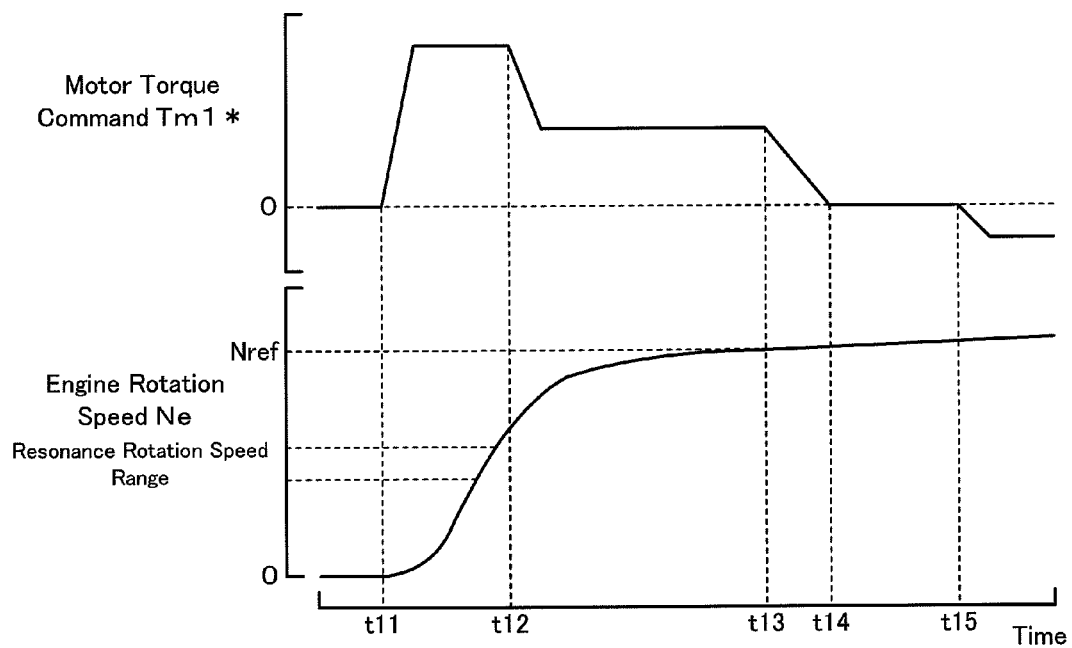
FIG. 10 shows one example of a start-up torque map referred to set a torque command Tm1* of a motor MG1 at a start-up of the engine 22 and a corresponding variation in rotation speed Ne of the engine 22.

Under the conditions that the engine 22 is at stop (step S120) and is not in the start-up state (step S270) and that the power demand Pe* is not less than the preset reference value Pstart (step S280), it is determined to start up the engine 22. The torque command Tm1* of the motor MG1 is then set corresponding to an elapsed time 't' since the beginning of the start-up of the engine 22 with reference to a start-up torque map (step S290). FIG. 10 shows one example of the start-up torque map referred to set the torque command Tm1* of the motor MG1 at the start-up of the engine 22, and a corresponding variation in rotation speed Ne of the engine 22. In the start-up torque map of this illustrated example, immediately after a time point t11 when a start-up instruction of the engine 22 is given, the rating process starts to set a relatively large torque to the torque command Tm1* and promptly increase the rotation speed Ne of the engine 22. At a time point t12 when the rotation speed Ne of the engine 22 has passed through a resonance rotation speed range or when a time period required for passing through the resonance rotation speed range has elapsed, a torque required for stably motoring the engine 22 at or over a reference rotation speed Nref is set to the torque command Tm1* of the motor MG1 to reduce the power consumption and the reactive force applied to the ring gear shaft 32a or the driveshaft. At a time point t13 when the rotation speed Ne of the engine 22 reaches the reference rotation speed Nref, the rating process starts to decrease the torque command Tm1* to 0. At a time point t15 when the complete explosive combustion of the engine 22 is detected, a power generation torque is set to the torque command Tm1*. The reference rotation speed Nref is a criterion for starting the fuel injection control and the ignition control of the engine 22. In the start-up state of the engine 22, a rating value used for the rating process is set to the torque command Tm1* of the motor MG1.

After setting the torque command Tm1* of the motor MG1 in the above manner, the tentative torque Tm2tmp as the provisional value of torque to be output from the motor MG2 is computed by adding the result of division of the torque command Tm1* of the motor MG1 by the gear ratio ρ of the power distribution integration mechanism 30 to the torque demand Tr* according to Equation (3) given above (step S300). The CPU 72 calculates the lower torque restriction Tm2min and the upper torque restriction Tm2max of the motor MG2 according to Equations (4) and (5) given above (step S310), limits the tentative torque Tm2tmp with the lower torque restriction Tm2min and the upper torque restriction Tm2max according to Equation (6) given above to set the torque command Tm2* of the motor MG1 (step S320), and sends the settings of the torque commands Tm1* and Tm2* of the motors MG1 and MG2 to the motor ECU 40 (step S330).

It is then determined whether the rotation speed Ne of the engine 22 reaches the reference rotation speed Nref as the criterion for starting the fuel injection control and the ignition control of the engine 22 (step S340). At the beginning of the start-up of the engine 22, the rotation speed Ne of the engine 22 is significantly low and does not reach the reference rotation speed Nref. In response to a negative answer at step S340, the drive control routine is terminated without starting the fuel injection control and the ignition control.

Figure 11:
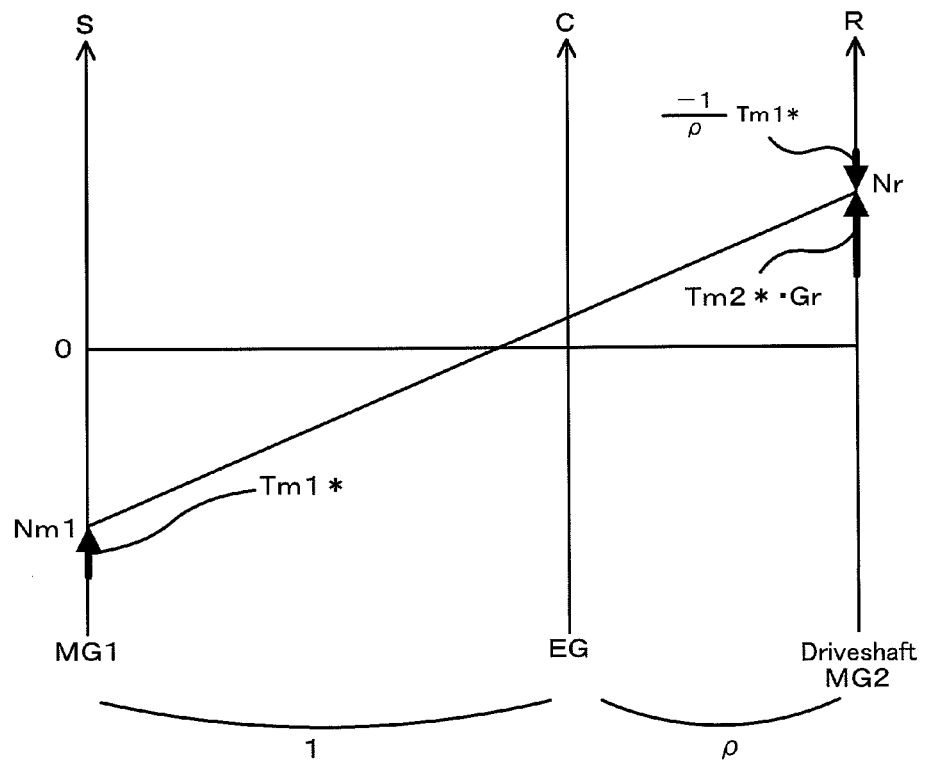
FIG. 11 is an alignment chart showing torque-rotation speed dynamics of the respective rotational elements included in the power distribution integration mechanism 30 during a drive of the hybrid vehicle with motoring the engine 22.

On the start of the start-up of the engine 22, it is determined at step S270 that the engine 22 is in the start-up state. The processing of steps S290 to S330 discussed above is then performed. The CPU 72 waits until the rotation speed Ne of the engine 22 reaches the reference rotation speed Nref for starting the fuel injection control and the ignition control (step S340) and sends a control signal to the engine ECU 24 to start the fuel injection control and the ignition control (step S350). Such control enables the hybrid vehicle 20 to be driven with output of the torque demand Tr* from the motor MG2 to the ring gear shaft 32a or the driveshaft in the range of the input limit Win and the output limit Wout of the battery 50, while restarting the engine 22 from its operation stop state. FIG. 11 is an alignment chart showing torque-rotation speed dynamics of the respective rotational elements included in the power distribution integration mechanism 30 during a drive of the hybrid vehicle 20 with motoring the engine 22.

As described above, the hybrid vehicle 20 of the embodiment sets the value W1 to the stop decision reference value Wstop in response to the OFF condition of the ECO switch 89, while setting the value W2 smaller than the value W1 to the stop decision reference value Wstop in response to the ON condition of the ECO switch 89. When the output limit Wout of the battery 50, which is set according to the battery temperature Tb, is not less than the stop decision reference value Wstop during a drive of the hybrid vehicle 20 with a start of the engine 22 in the cold environment, the intermittent operation of the engine 22 is permitted. When the output limit Wout is less than the stop decision reference value Wstop, on the other hand, the intermittent operation of the engine 22 is prohibited. In the OFF condition of the ECO switch 89, the intermittent operation of the engine 22 starts after the sufficient warm-up of the battery 50 to the level of ensuring output of the sufficient electric power from the battery 50. In the ON condition of the ECO switch 89, on the other hand, the intermittent operation of the engine 22 starts after the warm-up of the battery 50 to the level of ensuring output of the minimum required electric power from the battery 50. Such control ensures a smooth restart of the engine 22 in the ordinary state, while improving the energy efficiency in response to the driver's instruction.

In the hybrid vehicle 20 of the embodiment, for a smooth restart of the engine 22, the procedure compares the output limit Wout of the battery 50 with the set stop decision reference value Wstop and either permits the engine 22 to stop or prohibits the engine 22 from stopping according to the result of the comparison. The decision for engine stop permission/prohibition may be made under engine stop control of cutting off the fuel supply to the engine 22 and lowering the rotation speed of the engine 22 by torque output from the motor MG1 accompanied with power generation to stop the operation of the engine 22. In this state, for the normal engine stop control, a modified procedure may compare the input limit Win of the battery 50 with a stop decision reference value Wstop2 and either permit the engine 22 to stop or prohibit the engine 22 from stopping according to the result of the comparison. In the engine stop control, in response to output of a torque from the motor MG1 to lower the rotation speed Ne of the engine 22, a corresponding torque is applied to the ring gear shaft 32a. The torque command Tm2* of the motor MG2 is thus set according to Equations (3) through (6) given above to cancel the torque applied to the ring gear shaft 32a and ensure output of the torque demand Tr* to the ring gear shaft 32a.

Figure 12:
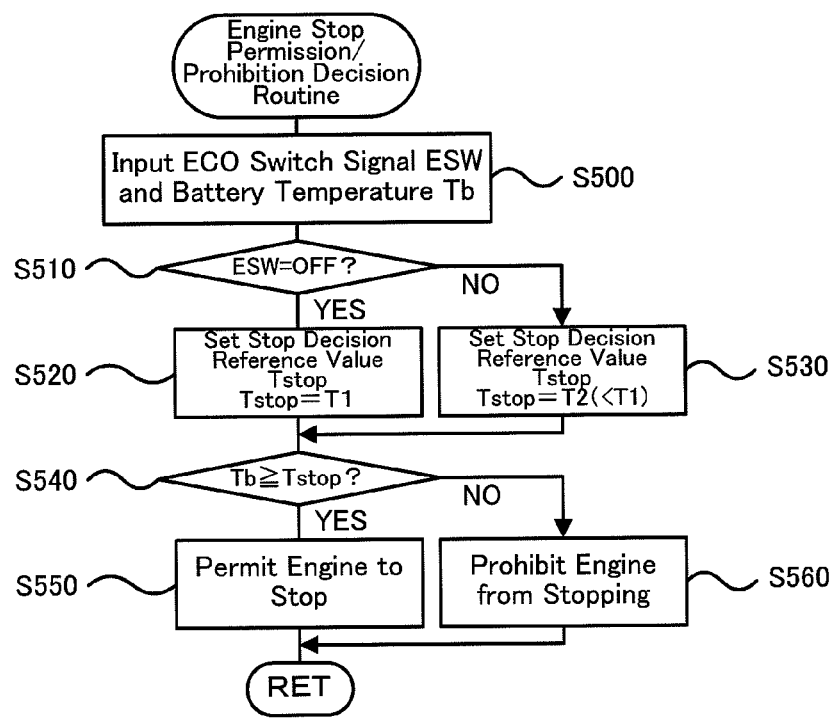
FIG. 12 is a flowchart showing a modified engine stop permission/prohibition decision routine as one modified example.

The hybrid vehicle 20 of the embodiment determines whether the engine 22 is permitted to stop or prohibited from stopping, based on the output limit Wout that is set according to the battery temperature Tb and the state of charge SOC of the battery 50. One modified procedure may determine whether the engine 22 is permitted to stop or prohibited from stopping, directly based on the battery temperature Tb of the battery 50. This modified procedure is shown as an engine stop permission/prohibition decision routine of FIG. 12. In this modified engine stop permission/prohibition decision routine of FIG. 12, the CPU 72 inputs the ECO switch signal ESW from the ECO switch 89 and the battery temperature Tb from the motor ECU 40 by communication (step S500) and identifies whether the input ECO switch signal ESW is OFF or ON (step S510). Upon identification of the OFF condition of the ECO switch signal ESW, the CPU 72 sets a stop decision reference value Tstop to a value T1 (step S520). Upon identification of the ON condition of the ECO switch signal ESW, on the other hand, the CPU 72 sets the stop decision reference value Tstop to a value T2 (step S530) The input battery temperature Tb is then compared with the set stop decision reference value Tstop (step S540). When the battery temperature Tb is not lower than the set stop decision reference value Tstop, the engine 22 is permitted to stop (step S550). When the battery temperature Tb is lower than the set stop decision reference value Tstop, on the other hand, the engine 22 is prohibited from stopping (step S560). The value T1 is specified as a warm-up temperature of the battery 50 required for a smooth restart of the engine 22 after its stop during a drive of the vehicle. The value T2 is specified to be close to a minimum warm-up temperature of the battery 50 required for a restart of the engine 22 after its stop during a drive of the vehicle and is set to be smaller than the value T1. Like the control of the embodiment discussed above, such control of the modified procedure ensures a smooth restart of the engine 22 in the ordinary state, while improving the energy efficiency in response to the driver's instruction.

In the hybrid vehicle 20 of the embodiment, the motor MG2 is connected with the ring gear shaft 32a or the driveshaft via the reduction gear 35. The motor MG2 may directly be connected with the ring gear shaft 32a or may otherwise be connected with the ring gear shaft 32a via a transmission having, for example, 2 speeds, 3 speeds, or 4 speeds, instead of the reduction gear 35.

Figure 13:
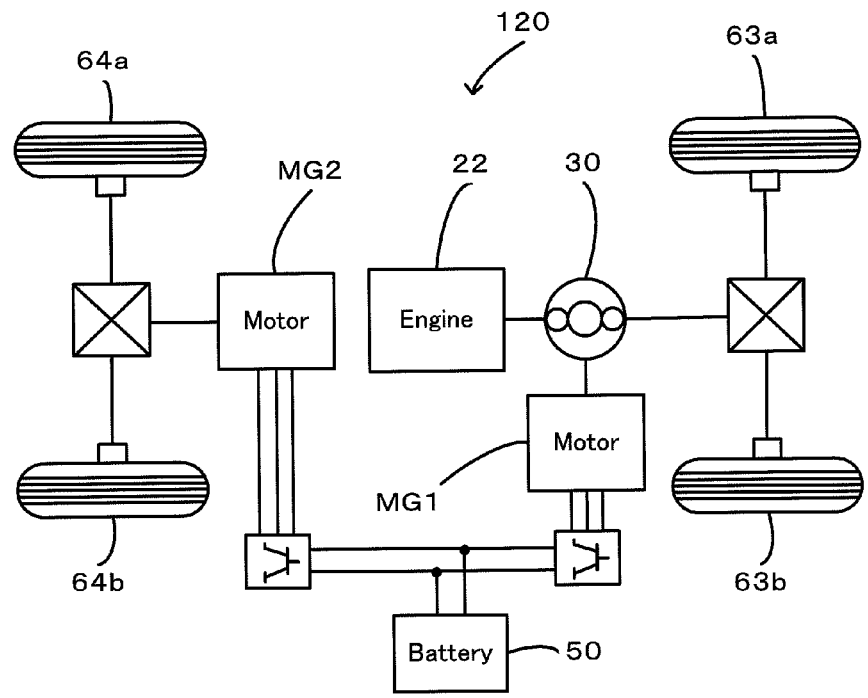
FIG. 13 schematically illustrates the configuration of another hybrid vehicle 120 in one modified example.

In the hybrid vehicle 20 of the embodiment, the power of the motor MG2 is converted by the reduction gear 35 and is output to the ring gear shaft 32a. The technique of the invention is also applicable to a hybrid vehicle 120 of a modified structure shown in FIG. 13. In the hybrid vehicle 120 of FIG. 13, the power of the motor MG2 is connected to another axle (an axle linked with wheels 64a and 64b) that is different from the axle connecting with the ring gear shaft 32a (the axle linked with the drive wheels 63a and 63b).

Figure 14:
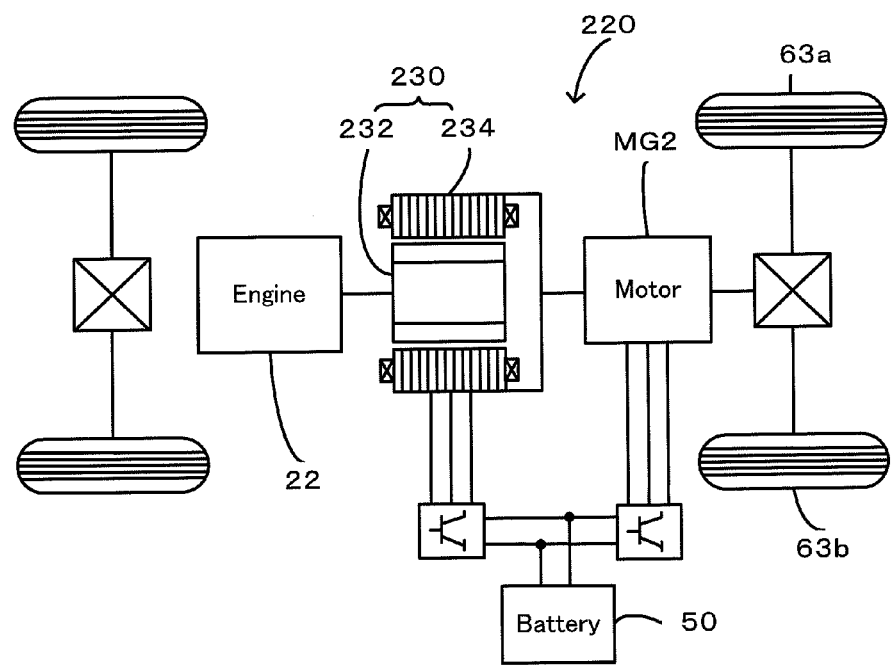
FIG. 14 schematically illustrates the configuration of still another hybrid vehicle 220 in another modified example.

In the hybrid vehicle 20 of the embodiment, the power of the engine 22 is transmitted via the power distribution integration mechanism 30 to the ring gear shaft 32a or the driveshaft linked with the drive wheels 63a and 63b. The technique of the invention is also applicable to a hybrid vehicle 220 of another modified structure shown in FIG. 14. The hybrid vehicle 220 of FIG. 14 is equipped with a pair-rotor motor 230. The pair-rotor motor 230 includes an inner rotor 232 connected to the crankshaft 26 of the engine 22 and an outer rotor 234 connected to a driveshaft for outputting power to the drive wheels 63a and 63b. The pair-rotor motor 230 transmits part of the output power of the engine 22 to the driveshaft, while converting the residual engine output power into electric power.

The primary elements in the embodiment and its modified examples are mapped to the primary constituents in the claims of the invention as described below. The engine 22 of the embodiment corresponds to the 'internal combustion engine' of the invention. The combination of the power distribution integration mechanism 30 with the motor MG1 is equivalent to the 'electric power-mechanical power input output assembly' of the invention. The motor MG2, the battery 50, and the temperature sensor 51 of the embodiment respectively correspond to the 'motor', 'accumulator', and the 'temperature detector' of the invention. The battery ECU 52 of setting the input limit Win as the allowable maximum charging electric power to be charged in the battery 50 and the output limit Wout as the allowable maximum discharging electric power to be discharged from the battery 50 corresponding to the battery temperature Tb and the state of charge SOC of the battery 50, which is calculated from the integrated value of the charge-discharge current measured by the current sensor is equivalent to the 'allowable maximum electric power setting module' of the invention. The ECO switch 89 is equivalent to the 'fuel consumption priority switch' of the invention. The hybrid electronic control unit 70 of executing the engine stop permission/prohibition decision routine of FIG. 5 is equivalent to the 'intermittent operation permission/prohibition module' of the invention. The engine stop permission/prohibition decision routine of FIG. 5 sets the stop decision reference value Wstop to the value W1 in the OFF condition of the ECO switch 89, while setting the stop decision reference value Wstop to the value W2 smaller than the value W1 in the ON condition of the ECO switch 89. The engine stop permission/prohibition decision routine of FIG. 5 permits the engine 22 to stop when the output limit Wout of the battery 50 is not less than the set stop decision reference value Wstop, while prohibiting the engine 22 from stopping when the output limit Wout of the battery 50 is less than the set stop decision reference value Wstop. The motor MG1 and the power distribution integration mechanism 30 of the embodiment respectively correspond to the 'generator' and the 'three shaft-type power input output structure' of the invention. The pair-rotor motor 230 in the modified example also corresponds to the 'electric power-mechanical power input output assembly' of the invention. The 'internal combustion engine' is not restricted to the internal combustion engine designed to consume a hydrocarbon fuel, such as gasoline or light oil, and thereby output power, but may be an internal combustion engine of any other design, for example, a hydrogen engine. The 'electric power-mechanical power input output assembly' is not restricted to the combination of the power distribution integration mechanism 30 with the motor MG1 or to the pair-rotor motor 230 but may be any structure connected with an output shaft of the internal combustion engine and with a driveshaft linked to an axle of the vehicle and designed to utilize a reactive force on the driveshaft and input and output a torque from and to the output shaft of the internal combustion engine through input and output of electric power and mechanical power. The 'motor' is not restricted to the motor MG2 constructed as a synchronous motor generator but may be any type of motor designed to input and output power from and to the driveshaft, for example, an induction motor. The accumulator' is not restricted to the battery 50 as a secondary battery but may be a capacitor or any other storage unit arranged to transmit electric power to and from the electric power-mechanical power input output assembly and the motor. The 'allowable maximum electric power setting module' is not restricted to the arrangement of setting the input limit Win and the output limit Wout corresponding to the state of charge SOC and the battery temperature Tb of the battery 50 but may be any arrangement of setting an allowable maximum electric power to be charged into the accumulator or to be discharged from the accumulator according to the state of the accumulator, for example, an internal resistance of the battery 50, in addition to the state of charge SOC and the battery temperature Tb of the battery 50. The 'intermittent operation permission/prohibition module' is not restricted to the arrangement to set the stop decision reference value Wstop to the value W1 in the OFF condition of the ECO switch 89 while setting the stop decision reference value Wstop to the value W2 smaller than the value W1 in the ON condition of the ECO switch 89, and to permit the engine 22 to stop when the output limit Wout of the battery 50 is not less than the set stop decision reference value Wstop in the operation state of the engine 22 while prohibiting the engine 22 from stopping when the output limit Wout of the battery 50 is less than the set stop decision reference value Wstop. The 'intermittent operation permission/prohibition module' is not restricted to the arrangement to set the stop decision reference value Tstop to the value T1 in the OFF condition of the ECO switch 89 while setting the stop decision reference value Tstop to the value T2 smaller than the value T1 in the ON condition of the ECO switch 89, and to permit the engine 22 to stop when the battery temperature Tb is not lower than the stop decision reference value Tstop in the operation state of the engine 22 while prohibiting the engine 22 from stopping when the battery temperature Tb is lower than the stop decision reference value Tstop. The 'intermittent operation permission/prohibition module' may be designed to, in the setting of the fuel consumption priority switch giving no instruction for a drive with priority to the fuel consumption, prohibit the intermittent operation of the internal combustion engine when the allowable maximum electric power of the accumulator is less than a first electric power and to permit the intermittent operation of the internal combustion engine when the allowable maximum electric power of the accumulator is not less than the first electric power. The 'intermittent operation permission/prohibition module' may be designed to, in the setting of the fuel consumption priority switch giving an instruction for a drive with priority to the fuel consumption, prohibit the intermittent operation of the internal combustion engine when the allowable maximum electric power of the accumulator is less than a second electric power that is smaller than the first electric power and to permit the intermittent operation of the internal combustion engine when the allowable maximum electric power of the accumulator is not less than the second electric power. The 'intermittent operation permission/prohibition module' may otherwise be designed to, in the setting of the fuel consumption priority switch giving no instruction for a drive with priority to the fuel consumption, prohibit the intermittent operation of the internal combustion engine when the temperature of the accumulator is lower than a first temperature and to permit the intermittent operation of the internal combustion engine when the temperature of the accumulator is not lower than the first temperature. The 'intermittent operation permission/prohibition module' may be designed to, in the setting of the fuel consumption priority switch giving an instruction for a drive with priority to the fuel consumption, prohibit the intermittent operation of the internal combustion engine when the temperature of the accumulator is lower than a second temperature that is less than the first temperature and to permit the intermittent operation of the internal combustion engine when the temperature of the accumulator is not lower than the second temperature. The 'generator' is not restricted to the motor MG1 constructed as a synchronous motor generator but may be any type of generator designed to input and output power, for example, an induction motor. The 'three shaft-type power input output structure' is not restricted to the power distribution integration mechanism 30 but may be any structure connected to three shafts, the driveshaft, the output shaft of the internal combustion engine, and a rotating shaft of the generator, and designed to input and output power to a residual shaft based on powers input from and output to any two shafts among the three shafts, for example, a structure adopting a double pinion-type planetary gear mechanism, a structure connected to four or a greater number of shafts by combination of multiple planetary gear mechanisms, or a structure adopting a differential gear or another differential motion mechanism other than the planetary gear mechanism. The above mapping of the primary elements in the embodiment and its modified examples to the primary constituents in the claims of the invention is not restrictive in any sense but is only illustrative for concretely describing the modes of carrying out the invention. Namely the embodiment and its modified examples discussed above are to be considered in all aspects as illustrative and not restrictive.

The embodiment discussed above is to be considered in all aspects as illustrative and not restrictive. There may be many modifications, changes, and alterations without departing from the scope or spirit of the main characteristics of the present invention.

The present invention claims priority from Japanese Patent Application No. 2007-290468 filed on Nov. 8, 2007, the entire contents of which are incorporated herein by reference.

What is claimed is:

1. A hybrid vehicle, comprising:
    an internal combustion engine;
    an electric power-mechanical power input output assembly connected with an output shaft of the internal combustion engine and with a driveshaft linked to an axle and constructed to utilize a reactive force on the driveshaft and input and output a torque from and to the output shaft of the internal combustion engine through input and output of electric power and mechanical power;
    a motor arranged to input and output power from and to the driveshaft;
    an accumulator configured to transmit electric power to and from the electric power-mechanical power input output assembly and the motor;
    a temperature detector constructed to detect temperature of the accumulator;
    an allowable maximum electric power setting module configured to set an allowable maximum electric power to be charged into the accumulator or to be discharged from the accumulator according to the detected temperature of the accumulator;
    a fuel consumption priority switch operated to give an instruction for a drive with priority to fuel consumption; and
    an intermittent operation permission/prohibition module configured to, in a setting of the fuel consumption priority switch giving no instruction for the drive with priority to the fuel consumption, prohibit intermittent operation of the internal combustion engine when the set allowable maximum electric power of the accumulator is less than a first electric power and to permit the intermittent operation of the internal combustion engine when the set allowable maximum electric power of the accumulator is not less than the first electric power,
    the intermittent operation permission/prohibition module being configured to, in a setting of the fuel consumption priority switch giving the instruction for the drive with priority to the fuel consumption, prohibit the intermittent operation of the internal combustion engine when the set allowable maximum electric power of the accumulator is less than a second electric power that is smaller than the first electric power and to permit the intermittent operation of the internal combustion engine when the set allowable maximum electric power of the accumulator is not less than the second electric power.

2. The hybrid vehicle in accordance with claim 1, wherein the intermittent operation permission/prohibition module is activated at a start of the internal combustion engine in a cold environment.

3. The hybrid vehicle in accordance with claim 1, wherein the electric power-mechanical power input output assembly has:

a generator designed to input and output power; and
a three shaft-type power input output structure connected to three shafts, the driveshaft, the output shaft of the internal combustion engine, and a rotating shaft of the generator, and designed to input and output power to a residual shaft based on powers input from and output to any two shafts among the three shafts.

4. A control method of a hybrid vehicle, the hybrid vehicle having: an internal combustion engine; an electric power-mechanical power input output assembly connected with an output shaft of the internal combustion engine and with a driveshaft linked to an axle and constructed to utilize a reactive force on the driveshaft and input and output a torque from and to the output shaft of the internal combustion engine through input and output of electric power and mechanical power; a motor arranged to input and output power from and to the driveshaft; and an accumulator configured to transmit electric power to and from the electric power-mechanical power input output assembly and the motor, the control method comprising:
in a setting of a fuel consumption priority switch giving no instruction for a drive with priority to fuel consumption, prohibiting intermittent operation of the internal combustion engine when temperature of the accumulator is lower than a first temperature and permitting the intermittent operation of the internal combustion engine when the temperature of the accumulator is not lower than the first temperature, and
in a setting of the fuel consumption priority switch giving the instruction for the drive with priority to the fuel consumption, prohibiting the intermittent operation of the internal combustion engine when the temperature of the accumulator is lower than a second temperature that is less than the first temperature and permitting the intermittent operation of the internal combustion engine when the temperature of the accumulator is not lower than the second temperature.

5. A hybrid vehicle, comprising:
an internal combustion engine;
an electric power-mechanical power input output assembly connected with an output shaft of the internal combustion engine and with a driveshaft linked to an axle and constructed to utilize a reactive force on the driveshaft and input and output a torque from and to the output shaft of the internal combustion engine through input and output of electric power and mechanical power;
a motor arranged to input and output power from and to the driveshaft;
an accumulator configured to transmit electric power to and from the electric power-mechanical power input output assembly and the motor;
a temperature detector constructed to detect temperature of the accumulator;
a fuel consumption priority switch operated to give an instruction for a drive with priority to fuel consumption; and
an intermittent operation permission/prohibition module configured to, in a setting of the fuel consumption priority switch giving no instruction for the drive with priority to the fuel consumption, prohibit intermittent operation of the internal combustion engine when the detected temperature of the accumulator is lower than a first temperature and to permit the intermittent operation of the internal combustion engine when the detected temperature of the accumulator is not lower than the first temperature,
the intermittent operation permission/prohibition module being configured to, in a setting of the fuel consumption priority switch giving the instruction for the drive with priority to the fuel consumption, prohibit the intermittent operation of the internal combustion engine when the detected temperature of the accumulator is lower than a second temperature that is less than the first temperature and to permit the intermittent operation of the internal combustion engine when the detected temperature of the accumulator is not lower than the second temperature.

6. The hybrid vehicle in accordance with claim 5, wherein the intermittent operation permission/prohibition module is activated at a start of the internal combustion engine in a cold environment.

7. The hybrid vehicle in accordance with claim 5, wherein the electric power-mechanical power input output assembly has:
a generator designed to input and output power; and
a three shaft-type power input output structure connected to three shafts, the driveshaft, the output shaft of the internal combustion engine, and a rotating shaft of the generator, and designed to input and output power to a residual shaft based on powers input from and output to any two shafts among the three shafts.

8. A control method of a hybrid vehicle, the hybrid vehicle having: an internal combustion engine; an electric power-mechanical power input output assembly connected with an output shaft of the internal combustion engine and with a driveshaft linked to an axle and constructed to utilize a reactive force on the driveshaft and input and output a torque from and to the output shaft of the internal combustion engine through input and output of electric power and mechanical power; a motor arranged to input and output power from and to the driveshaft; and an accumulator configured to transmit electric power to and from the electric power-mechanical power input output assembly and the motor, the control method comprising:
(a) setting an allowable maximum electric power to be charged into the accumulator or to be discharged from the accumulator according to temperature of the accumulator; and
(b) in a setting of a fuel consumption priority switch giving no instruction for a drive with priority to fuel consumption, prohibiting intermittent operation of the internal combustion engine when the set allowable maximum electric power of the accumulator is less than a first electric power and permitting the intermittent operation of the internal combustion engine when the set allowable maximum electric power of the accumulator is not less than the first electric power, and
in a setting of the fuel consumption priority switch giving the instruction for the drive with priority to the fuel consumption, prohibiting the intermittent operation of the internal combustion engine when the set allowable maximum electric power of the accumulator is less than a second electric power that is smaller than the first electric power and permitting the intermittent operation of the internal combustion engine when the set allowable maximum electric power of the accumulator is not less than the second electric power.

* * * * *